Jan. 25, 1949.   H. H. FURN   2,459,931
PRESSURE GAUGE
Filed Jan. 12, 1945   2 Sheets-Sheet 1
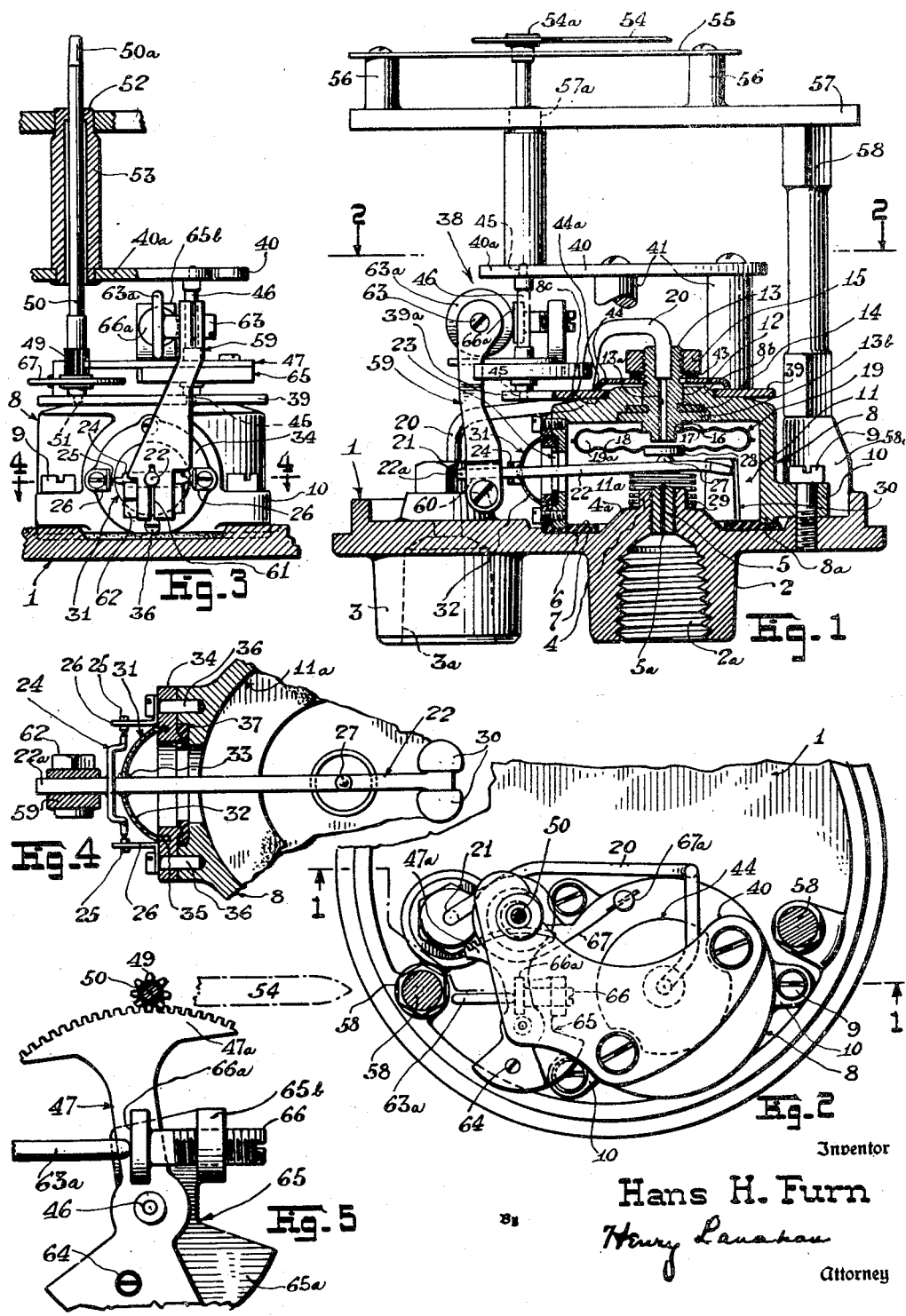
Inventor
Hans H. Furn
Henry Lanahan
Attorney Patented Jan. 25, 1949

2,459,931

UNITED STATES PATENT OFFICE 2,459,931

PRESSURE GAUGE

Hans H. Furn, Orange, N. J., assignor to Thomas A. Edison, Incorporated, West Orange, N. J., a corporation of New Jersey Application January 12, 1945, Serial No. 572,540

15 Claims. (Cl. 73—407)

This invention relates to pressure-responsive indicating instruments and, particularly, to such instruments adapted for use in aircraft. More especially, the invention is concerned with a "sealed-in" type of differential pressure gauge wherein the indications are taken from a pressure chamber through a motion seal.

It is an object of my invention to provide an improved differential gauge having a durable construction adapted to meet the rigorous requirements of aircraft use.

It is another object to provide an improved construction of such gauge which can be finely adjusted to compensate for manufacturing tolerances so that the instrument is readily calibrated to a given scale.

Another object is to provide a simple construction of such gauge which is easy to assemble and economical to build.

Another object is to provide such gauge having an even scale distribution.

Still other objects are to provide an improved motion seal for instruments of the character mentioned which is capable of transmitting limited pivotal movement without friction, to provide such a motion seal which is substantially unresponsive to pressure, and to provide a motion seal which is simple, rugged and characterized by a minimum stress for a given pressure against it.

These and other objects of my invention will be apparent from the following description and the appended claims.

In the description of my invention reference is had to the accompanying drawings, of which:

Figure 1 is a view of a gauge according to my invention showing parts in section on the line 1—1 of Figure 2;

Figure 2 is a partially sectional view taken on the line 2—2 of Figure 1;

Figure 3 is a partial lefthand elevational view of the structure of Figure 1, but with parts in vertical section;

Figure 4 is a partial sectional view taken on the line 4—4 of Figure 3;

Figure 5 is an enlarged detailed view of a portion of a motion-transmitting mechanism of the gauge.

Figure 6:
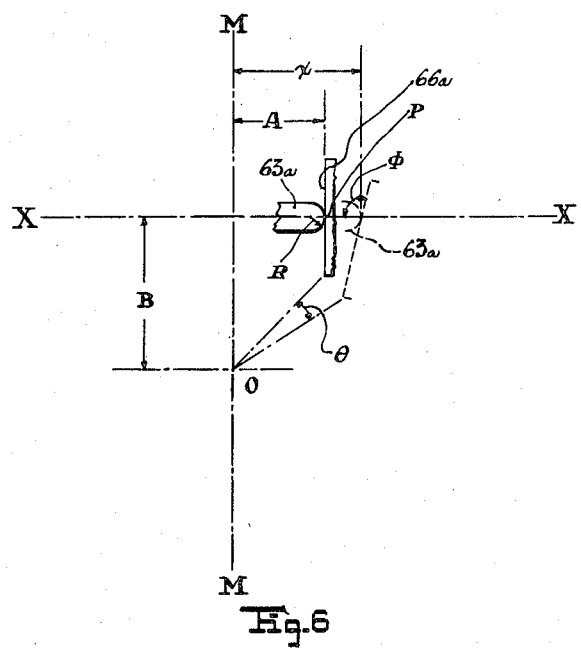
Figure 6 is a diagrammatic view of parts of the structure of Figure 5 with various parameters indicated as employed in the derived formula for expressing the transmitting characteristic of the motion-transmitting mechanism.

The present gauge has a base 1 provided with two depending bosses 2 and 3 which have interiorly-threaded orifices 2a and 3a for pipe connections to sources of fluid pressure. At the side of the base opposite the boss 2 there is an inner boss 4. Threaded through this boss 4 from the inner end of the orifice 2a is a plug 5 having a small axial opening 5a running therethrough. Surrounding the boss 4 is a flat-bottomed annular recess 6 in which lies a gasket 7. Clamped tightly in fluid-tight relation against this gasket is a rim 8a of an inverted cup-shaped housing 8 which overlies and surrounds the boss 4, the housing being clamped to the base by screws 9 which pass through apertured lugs 10 of the housing and thread into the base. This housing forms with the base 1 a pressure chamber 11 to which communication is had by way of the orifice 2a and the opening 5a.

The housing 8 has an opening 12 in its top wall which is substantially in a line with the inlet opening 5a. Fitting the opening 12 is a cylindrical plug 13 having an axial opening 13a running therethrough. The plug 13 has a flange 13b near the bottom thereof which engages a corresponding recess in the inner wall of the housing. Between the flange and the housing there is interposed a gasket 14. Under clamping pressure of a nut 15 that is threaded onto the exterior portion of the plug, the flange is held firmly against the gasket and a fluid-tight seal of the plug to the housing is obtained.

The plug 13 extends into the pressure chamber 11 and has an annular shoulder 16 at its end to which is soldered a corrugated diaphragm 17. Joined by soldering to the rim of this diaphragm is a second corrugated diaphragm 18 forming therewith a sealed capsule 19. This capsule divides the interior space of the pressure chamber 11 into two compartments: a compartment 11a surrounding the capsule and a compartment 19a within the capsule. The capsule communicates through the plug 13 by way of a tube 20 with the orifice 3a, the tube being sealed at one end to the plug and sealed at the other end, as at 21, to the base 1.

It will be understood that the capsule is compressed or expanded according to whether the pressure in compartment 11a is higher or lower than that in 19a inside the capsule. Thus the capsule responds according to the differential pressure applied to the two inlet orifices 2a and 3a, and constitutes a pressure-responsive actuating means for the instrument. Preferably a single capsule is used as described, but it will be understood that a tandem arrangement of two or more capsules may be used as an alternative arrangement. Also, it will be understood that, as concerns many features of my invention hereinafter described, such single or plural capsule arrangement or other suitable pressure-responsive diaphragm means may be used.

For transmitting motion from the capsule to the space outside the compartment 11a there is a lever 22 which passes out through a side opening 23 in the housing 8. Secured to an exterior portion of the lever 22 is a yoke cross bar 24 (see Figure 4) having trunnions engaging pivot screws 25 held by lugs 26 to the housing, the pivot axis for the lever being substantially parallel to the medial plane of the capsule 19, that is, the central plane through the junction line between the diaphragms 17 and 18. Mounted on the inner portion of the lever 22, in a position axially in line with the capsule, is a semispherical ball 27. This ball is held in contact with a button 28, which is carried by the lower diaphragm 18 of the capsule 19, by a compression spring 29 interposed between the lever and an annular shoulder 4a on the boss 4. For constraining the lever 22 against sidewise motion, such as it might tend to have in response to heavy vibration of the instrument, the inner end of the lever is interposed slidably between two upright posts 30 which extend up from the base within the compartment 11a.

The side wall opening 23 in the housing 8 is closed fluid-tight by a motion seal 31 comprising a diaphragm 32. This diaphragm is arcuate in cross section, being in the form of a hemisphere. Preferably, I use a substantially semispherical diaphragm—having its center of curvature substantially at the center of the opening 23, for then the diaphragm has the smallest possible radius of curvature and is subjected to the least tensile stress for a given pressure acting against the diaphragm. Also, a diaphragm which is arcuate in cross section has initially the shape it tends inherently to assume when subjected to pressure. Thus the diaphragm is substantially unresponsive to pressure within a wide pressure range. For instance a diaphragm having .003" wall thickness and made of beryllium copper will withstand pressures of 50 pounds per square inch with a multiple times factor of safety. Accordingly, the lever 22 is permitted to be passed through and soldered rigidly to the diaphragm, as at 33, without encountering any substantial tendency for the diaphragm to displace the lever longitudinally as the pressure varies in the compartment 11a.

The diaphragm 32 is mounted fluid-tight onto an annular plate 34 by inserting the rim of the diaphragm into an annular groove 35 in the plate and soldering the diaphragm thereto. The plate 34 surrounds the opening 23 and is clamped to the housing by screws 36, the joint to the housing being made fluid-tight by a gasket 37 interposed between the plate and the housing.

The lugs 26 abovementioned are also suitably secured to the plate 34. Preferably, the pivots 25 carried by these lugs are so located that the pivot axis of the lever 22 is on a line passing through the junction point of the lever with the diaphragm 32. The advantage in so locating this pivot axis is that the diaphragm is subjected to the least strain for a given deflection of the lever 22.

Mounted on top of the housing 8 in a unitary frame assembly is a motion-transmitting mechanism generally referred to as 38. This frame assembly comprises a bottom plate 39 and an upper plate 40 held fixed in spaced parallel relation with the bottom plate by intervening posts 41. The bottom plate has a large aperture clearing a boss 8b on the top of the housing 8, and is clamped firmly against a flat 8c, which surrounds the boss 8b, by the nut 15 aforementioned acting through a collar 43 and clamping member 44 both of which surround the plug 13. The clamping member is a substantially circular plate overlying the boss 8b—being only notched to clear the two posts 41 as shown in Figure 2—and has a turned-down rim 44a which bears against the plate 39 and spaces the clamping member from the boss 8b.

The frame plates 39 and 40 have latterly-extending arms 39a and 40a at the side of the housing where the motion seal 31 is located. These arms have vertically-aligned apertures 45 forming top and bottom bearings for a shaft 46. Secured to this shaft is a gear sector 47. This gear sector engages a pinion 49 secured to the lower end portion of an indicator shaft 50. This shaft has a journal 51 at its lower end in the arm 39a and has a journal 52 to the upper portion of a hollow post 53 that is staked at its lower end to the arm 40a.

The shaft 50 has a tapered end portion 50a onto which is pressed and frictionally held a hub 54a of a pointer 54. This pointer overlies a dial 55 which is mounted on short standards 56 of a frame plate 57. This frame plate is carried by relatively long studs 58 which thread into standards 58a on the base 1. To rigidify the post 53 the upper end portion thereof is fitted into an opening 57a in the plate 57.

Between the lever 22 and the lever 47 there is an adjustable coupling certain aspects of which are described and claimed in the pending Kelly application Serial No. 561,623, filed November 2, 1944 (now Patent No. 2,443,252) and having a common assignee with the present application. This coupling comprises a vertical arm 59 having a circular hole 60 in its lower end portion which is engaged by an exterior portion 22a (of circular cross section) of the lever 22. Running through the hole 60 and out through the bottom of the lever of the arm 59 is a slit 61 and extending transversely through this bifurcated end portion of the arm 59 is a bolt 62. Under clamping pressure of the bolt 62 the arm 59 is secured firmly to the lever 22. By this arrangement the arm 59 is permitted to be adjusted angularly and longitudinally with respect to the lever 22, for purposes hereinafter explained. Threadingly engaging the upper end portion of the arm 59 is a screw 63 which has its longitudinal axis substantially parallel to the pivot axis of the lever 22. This screw is provided with a circular concentric driving head 63a which is substantially parallel to and offset from the shaft 46 as appears in Figure 3. Secured by screws 64 to a tailpiece of the gear sector 47 is a member 65 having a wing portion 65a serving as a counterweight for the gear sector. At the side of the shaft 46 opposite the tail-piece 65a the member 65 has a turned-up lug 65b. Threadingly engaging this lug is a screw 66 which is at right angles to the shaft 46. This screw has a flat head with an end face 66a confronting the peripheral edge of the driving head 63a. In response to the biasing of the gear sector 47 provided by a hair spring 67 acting on the indicator shaft 50 and anchored to the frame plate 39 at 67a, as shown in Figure 2, the gear sector 47 is biased to maintain the screw head 66a continuously in contact with the peripheral edge of the driving head 63a.

When the pressure inside the capsule 19 rises relative to the pressure in the compartment 11a, the capsule expands and actuates the lever 22 in a clockwise direction as the lever apears in Figure 1. This causes the gear sector 47 to be turned clockwise and the pointer 54 to be turned counterclockwise as they are viewed from the top of the instrument. Vice versa, when the relative pressure in the capsule falls, the reverse movements take place. A limit on the expansion of the capsule is provided by the abutment of the lever 22 against the plug 5. This plug may be threaded inwardly or outwardly with respect to the pressure chamber 11 to set the maximum expansion to smaller and greater limits. A fixed limit on the compression of the capsule is provided by the abutment of the lower diaphragm 18 of the capsule against the inner end of the plug 13.

In order that the resilience of the capsule 19 will be controlling in the operation of the gauge, the capsule is provided with a high spring constant—i. e., a high degree of stiffness—relative to the constant of the spring 29 and the effective constant of the diaphragm 32, the effective constant of this diaphragm being considered as the effective spring action of the diaphragm on the lever 22 at the axis of the capsule. Typically expressed in terms of linear motion of the contact ball 27 the capsule is many times stiffer than either the spring 29 or the diaphragm 32. However, in order that the spring 29 will exert sufficient force to maintain the lever 22 in contact continuously with the button 28, the spring 29 is operated under a relatively high degree of compression. Typically, to meet these desired conditions, the capsule may be made of beryllium copper of approximately .0055" wall thickness and may have an outside diameter of approximately 1", the spring 29 may be made of beryllium copper wire having approximately .020" diameter, and may be operated under such degree of compression that it will exert .3 pound force against the lever 22, and the diaphragm 32 may be made of beryllium copper of .003" wall thickness and may have a radius of approximately .4".

It will be understood that when the capsule 19 provides the controlling spring force in the operation of the gauge, the spring 29 and diaphragm 32 are effectively ruled out as factors in determining the calibration of the instrument. However, because of manufacturing tolerances, the capsules may not run truly uniform as some will expand substantially linearly with increasing pressure while others will expand at increasing or decreasing rates—i. e., the plot of the pressure-response characteristics of these other capsules are lines each having a single degree of curvature with increasing or decreasing slope. Also, manufacturing tolerances in the other parts of the instrument will cause variations in the calibration. However, it is found that by properly adjusting the coupling between the lever 22 and the gear sector 47, each instrument may be calibrated to a linear (evenly distributed) scale within the accepted tolerances of aircraft specifications.

The motion-transmitting mechanism 38 has inherently a non-linear transmission characteristic. However, within the working range of the instrument—which corresponds to about 18° movement of the gear sector 47—the mechanism can be adjusted so that it has an essentially linear characteristic or so that it has a non-linear characteristic of predetermined shape. For a better understanding of the operation of this mechanism there is shown a diagrammatic view in Figure 6 to illustrate the operation of the coupling between the arm 59 and the gear sector 47. In this view O represents the pivot axis of the gear sector, X—X is a plane in which moves the driving head 63a, this being hereinafter referred to as the path of travel of the driving head, M—M represents a medial plane through the axis O at right angles to the path X—X, 66a represents the end face of the screw 66 carried by the gear sector and P is the point of contact between the driving head and this face. By adjusting the arm 59 along the lever 22 the range of movement of the contact P can be shifted along the path X—X to one side or another of the medial plane M—M, and by substantial adjustment of the screw 66 relative to the gear sector 47 the angle $\phi$ between the face 66a and the path X—X at any given point within the working range can be varied. Both of these adjustments affect the transmitting characteristic of the mechanism 38 and are herein made to compensate for a non-linear response characteristic of the capsule 19 for the purposes of calibrating the instrument to a linear scale.

The angular response of the gear sector to movement of the head 63a along the path X—X may be expressed by the formula $$x = B \tan \theta + A \sec \theta - R (\sec \theta - 1)$$

where B is the distance of the pivot axis O from the path X—X, A is the distance of the face 66a from the medial plane when the face is in parallel relation thereto, positive values being used to the right of the plane and negative values to the left thereof, $\theta$ is the angle of variation of the gear sector from the angular position which it occupies when the face 66a is parallel to the medial plane, R is the radius of the contact face of the driving head 63a and $x$ is the distance of the driving head along the path X—X from the medial plane. The parameter A is directly related to the angle $\phi$ between the face 66a and the path X—X, and varies with the adjusting of the screw 66 relative to the gear sector, other adjustments being left the same. For any given angle $\phi$ at a given point in the working range, the parameter A may be readily determined as for example by graphical methods. Thus, by the above formula the transmitting characteristic of the mechanism 38 can be determined for any contact range to the right or left of the medial plane and for any given mean value of the angle $\phi$ within that range.

The tangent term in the above formula arises because of the contact point P being displaced from the medial plane M—M, the first secant term arises because of the face 66a being at an angle to the path X—X, and the last secant term arises because of the driving head 63a having a driving face of finite radius.

Typically, the term in this formula of principal consequence is the tangent term. Also, for many applications, this may be considered as being the only desired term. For instance, were only the tangent term present the response would be essentially linear in a limited range of the contact P to the right and left of the medial plane, say a range representing plus and minus 15° variation in the angle of the gear sector. The response of the gear sector to rightward movement of the driving head would be one of increasing slope in a contact range offset substantially to the left of the medial plane, and would be one of decreasing slope in a contact range offset substantially to the right of the medial plane. Thus, by merely adjusting the contact range relative to the medial plane, which is done by adjusting the arm 59 along the lever 22, the instrument would be calibrated approximately to a linear scale should the capsule 19 have a linear response characteristic or a non-linear characteristic with either increasing or decreasing slope, it being understood that the contact range is positioned to extend by approximately equal distances to the right and left of the medial plane for capsules having a substantially linear characteristic, to the left of the medial plane for capsules having a characteristic with decreasing slope and to the right of the medial plane for capsules having a characteristic with increasing slope.

In practice, the motion-transmitting mechanism 38 can be controlled so that its response will be approximately according to the tangent term. This is made possible because the two secant terms have opposite sign and may be made to substantially nullify one another within any one contact range by selection of the parameter R and appropriate adjustment of the mechanism to obtain the desired value of the parameter A. While this mode of operating the mechanism 38 is contemplated as a part of the present invention, preferably a small value of R is chosen so that the last secant term will be negligible relative to the other terms and the parameter A of the second secant term is then varied so as to exercise a fine control or correction over the response characteristic of the mechanism 38. Thus, the response characteristic may be established roughly by adjusting the arm 59 along the lever 22, and be then established finely to the desired shape by adjusting the screw 66 relative to the gear sector.

By way of illustration, the calibrating of the instrument to a linear scale for capsules 19 having different shapes of response characteristic may be carried out as follows: When the capsule has an approximately linear response characteristic the arm 59 is adjusted so that the contact range will extend by equal distances to the right and left of the medial plane. In this middle contact range, variations in the angle $\phi$ have little effect on the calibration and therefore this angle is in this range not critical. When the capsule has a characteristic with decreasing slope, the arm 59 is adjusted outwardly to set the contact range to the left of the medial plane. The effect of an angle $\phi$ of less than 90° in this range is to accentuate the non-linearity caused by the leftward offsetting of the contact range from the medial plane, the smaller the angle $\phi$ the greater being the accentuation. Thus, if after so adjusting the arm 59 the capsule is yet under-compensated the screw 66 is threaded back to decrease the mean value of the angle $\phi$ within the contact range. Vice versa, if less compensation is needed, the screw 66 is threaded outwardly to increase the angle $\phi$. When a capsule has a characteristic with increasing slope, the arm 59 is adjusted inwardly along the lever 22 to offset the contact range to the right of the medial plane. Here the effect of an angle $\phi$ less than 90° is to counteract the non-linearity caused by the rightward offsetting of the contact range, the smaller the angle the greater being the counteraction. Thus, if after so adjusting the arm 59 the capsule is yet undercompensated, the screw 66 is threaded outwardly to increase the angle $\phi$. Vice versa, if the capsule is overcompensated this screw is threaded inwardly.

It will be understood that upon making the adjustments above explained the pointer will have to be set at zero. Rough adjustments to zero are made by resetting the pointer on the shaft 50 by hand while the capsule is under a zero condition of pressure. Fine adjustments to zero are then made by means of the screw 66. Since only small adjustments of this screw are required for this purpose, these adjustments have negligible effect on the linearity of the calibration.

In addition to the foregoing linearity and zero adjustments, each calibration requires a rate adjustment, which is to set the length of scale deflection for a given change in the condition being measured. This is done by controlling the leverage between the arm 59 and the gear sector 47—i. e., adjusting the distance B in the diagram of Figure 6. Rough adjustments of this character are made by shifting the arm 59 angularly with respect to the lever 22. However, the usual and finer adjustments are made by threading the screw 63 relative to the arm 59, the effect of threading it inwardly being to increase the rate and that of threading it outwardly being to decrease that rate.

I have herein particularly shown and described my invention in terms of a specific preferred embodiment, but it will be understood that this embodiment is illustrative and not limitative of my invention as the same is subject to changes and modifications without departing from the scope thereof, which I endeavor to express according to the following claims.

I claim:

1. A motion seal for transmitting pivotal movement comprising a smooth flexible diaphragm, a relatively rigid lever means secured in fluid-tight relation to said diaphragm and having extending portions at opposite sides of the diaphragm, said lever means being pivoted at its junction with said diaphragm, and said diaphragm having a substantially hemispherical shape.

2. A motion seal for transmitting pivotal movement comprising a smooth flexible diaphragm having substantially the shape of a hemisphere, and a relatively rigid lever means extending centrally through said diaphragm and sealed thereto, said lever means being effectively pivoted on an axis transverse thereto at the junction of the lever means with said diaphragm.

3. A motion seal for transmitting pivotal movement between the inside and outside of a chamber containing fluid at pressure normally different from that of the outside, comprising a smooth flexible diaphragm forming a wall section of said chamber, a relatively rigid lever means sealed in fluid-tight relation to said diaphragm and having extending portions at opposite sides thereof, said lever means being pivoted at its junction with said diaphragm, and said diaphragm having a substantially hemispherical shape which is concave at the higher-pressure side of the diaphragm.

4. Means for transmitting pivotal movement between the inside and outside of a chamber, comprising a smooth flexible diaphragm forming a wall section of said chamber, a relatively rigid lever means secured in fluid-tight relation to said diaphragm and having extending portions at opposite sides thereof, means constraining said lever means to uniplanar pivotal movement about a transverse axis at the junction of the lever means with said diaphragm, and said diaphragm having a substantially hemispherical shape.

5. In a differential pressure gauge including indicating means and a closed housing having a pair of fluid inlet orifices; the combination of a yieldable capsule mounted in said housing and communicating with one of said orifices, the other of said orifices communicating with a chamber in said housing surrounding said capsule; a smooth flexible diaphragm constituting a wall portion of said chamber and having substantially hemispherical shape with a medial plane thereof substantially parallel to the medial plane of said capsule; a lever means secured in fluid-tight relation to said diaphragm and having portions extending into and out from said chamber, said outer lever portion being coupled to said indicating means; and means biasing said inner lever portion towards said capsule to hold the lever means in operative association with the capsule.

6. In an instrument including a pressure-responsive means and a pivoted indicating member: the combination of lever means pivoted on a predetermined axis and actuated by said pressure-responsive means; a gear pivoted on a second axis at right angles to said first axis and coupled to said indicating member; a first screw-threaded member secured to said lever means and disposed in substantially parallel relation to said first axis, said screw-threaded member having a circular concentric head offset from said second pivot axis; a second screw-threaded member secured to said gear and disposed substantially at right angles to said second pivot axis in spaced relation therefrom, said second screw-threaded member having an end face confronting the peripheral edge of the head of said first screw-threaded member; and biasing means holding said two screw-threaded members in contact with each other.

7. The combination set forth in claim 6 wherein said lever means includes an arm carrying said first screw-threaded member, said arm being adjustable in directions toward and away from said first axis.

8. In an instrument including movable indicating means and means mechanically responsive to variations in a condition to be measured, said responsive means being characterized as having a non-linear response characteristic with a single degree of curvature: a movement-transmitting mechanism intercoupling said responsive and indicating means and comprising a first element pivotally mounted on a first pivot axis and operatively coupled to one of said means, a second element pivoted on an axis at right angles to said first pivot axis and operatively coupled to the other of said means; means operatively holding said elements together in sliding contact with one another, said contact having a path of movement spaced from said first pivot axis, the portion of said second element cooperating with said first element having a substantially planar face; and said mechanism including means for adjusting the angle of said face relative to said path upon said responsive means being in a given fixed state of actuation whereby to compensate for the non-linearity in the characteristic of said responsive means.

9. In an instrument including movable indicating means and means mechanically responsive to variations in a condition to be measured: a movement-transmitting mechanism intercoupling said responsive and indicating means and comprising a first element pivotally mounted on a first pivot axis and operatively coupled to one of said means, a second element pivoted on an axis at right angles to said first pivot axis and operatively coupled to the other of said means; means operatively holding said elements together in slidable contact with one another, said contact having a path of movement offset from said first pivot axis, the portion of said second element cooperating with said first element having a substantially planar face and the portion of said first element cooperating with said face having a finite radius of curvature, said radius of curvature and the angle of said face to said path, for a given value in said condition, being in predetermined relationship with one another whereby the effect on the transmitting characteristic of said mechanism caused by said finite radius of curvature is substantially nullified by the effect on said characteristic caused by the angularity of said face to said path.

10. In an instrument including movable indicating means and means mechanically responsive to variations in a condition to be measured, said responsive means being characterized as having a non-linear response characteristic with a single degree of curvature: a movement-transmitting mechanism intercoupling said responsive and indicating means and comprising a first element pivotally mounted on a first pivot axis and operatively coupled to one of said means, a second element pivoted on an axis at right angles to said first pivot axis and operatively coupled to the other of said means; means operatively holding said elements together in slidable contact with one another, said contact having a path of movement offset from said first pivot axis, the portion of said first element cooperating with said second element having a substantially planar face; said mechanism including means for shifting the point of contact along said path for any given fixed state of actuation of said responsive means; and means associated with said first element for varying the angle of said face to said path at any given point of contact of said elements in said path.

11. In a pressure gauge including a movable pointer and a pressure-responsive diaphragm: a coupling mechanism including a pivoted gear coupled to said pointer; a lever pivoted on an axis transverse to the pivot axis of said gear and coupled to said diaphragm; a faced member on said gear; means holding said faced member in slidable contact with a portion of said lever; and means, associated with said faced member, for angularly adjusting the latter relative to said portion of said lever.

12. In a pressure gauge including a movable pointer and pressure-responsive diaphragm; a coupling mechanism including a pivoted gear coupled to said pointer; a lever pivoted on an axis transverse to the pivot axis of said gear and coupled to said diaphragm; an arm on said lever adjustable angularly and in translation relative to said gear axis; a faced member on said gear; means biasing said gear to hold said faced member in sliding contact with said arm; and means associated with said faced member for angularly adjusting the latter relative to said arm.

13. In a pressure gauge including a movable pointer and a pressure-responsive diaphragm: a coupling mechanism including a pivoted gear coupled to said pointer; a lever pivoted on an axis transverse to the pivot axis of said gear and coupled to said diaphragm; a headed member movably connected with said lever for adjustment transversely to the pivot axis of said gear; a faced member movably connected to said gear for adjustment in directions transverse to the pivot axis thereof; and means holding the peripheral edge of said headed member in contact with the end face of said last-mentioned member.

14. In a pressure gauge including a movable pointer and a pressure-responsive diaphragm: a coupling mechanism including a pivoted gear coupled to said pointer; a lever pivoted on an axis transverse to the pivot axis of said gear and coupled to said diaphragm; a member associated with said gear and having a faced portion; and a headed member movably connected to said lever for adjustment transversely to said gear axis and across said faced portion, said gear being biased whereby said faced portion is held in contact with the peripheral edge of said headed member.

15. In an instrument including movable indicating means and means mechanically responsive to variations in a condition to be measured, said responsive means being characterized as having a non-linear response characteristic with a single degree of curvature: a movement-transmitting mechanism intercoupling said responsive and indicating means and comprising a first element pivoted on a first axis and coupled to one of said means, a second element pivoted on a second axis at right angles to said first axis and coupled to the other of said means, said elements having portions in abutting contact with each other for causing one element to be turned as the other is turned, the movement of the point of contact between said elements being in a path transverse to and spaced from one of said axes, and means including an adjustable screw-threaded member carried by one of said elements for shifting said point of contact along said path while said responsive means is in a given fixed state of actuation whereby to compensate said mechanism substantially for the non-linearity of said responsive means.

HANS H. FURN.

REFERENCES CITED

The following references are of record in the file of this patent:

UNITED STATES PATENTS

| Number | Name | Date |
| --- | --- | --- |
| 1,219,699 | Brennan | Mar. 20, 1917 |
| 1,291,869 | Heeley | Jan. 21, 1919 |
| 1,702,056 | Murray | Feb. 12, 1929 |
| 1,747,338 | Vogt | Feb. 18, 1930 |
| 1,874,704 | Johnson | Aug. 30, 1932 |
| 1,891,134 | Barthel | Dec. 13, 1932 |
| 2,052,720 | MacLean et al. | Sept. 1, 1936 |
| 2,184,163 | Barnes | Dec. 19, 1939 |
| 2,196,932 | Menzer | Apr. 9, 1940 |
| 2,285,777 | Mack | June 9, 1942 |
| 2,299,179 | Rosenberger | Oct. 20, 1942 |
| 2,358,032 | Rothwell | Sept. 12, 1944 |
| 2,367,087 | Beecher | Jan. 9, 1945 |

FOREIGN PATENTS

| Number | Country | Date |
| --- | --- | --- |
| 538,650 | Great Britain | 1941 |
| 814,248 | France | Mar. 15, 1937 |